(12) United States Patent
Metts et al.

(10) Patent No.: US 9,825,839 B2
(45) Date of Patent: Nov. 21, 2017

(54) EDGE ANALYTICS

(71) Applicant: Cable Television Laboratories, Inc., Louisville, CO (US)

(72) Inventors: Nicolas Metts, Superior, CO (US); Dan Lavender, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 130 days.

(21) Appl. No.: 14/797,097

(22) Filed: Jul. 11, 2015

(65) Prior Publication Data

US 2016/0014008 A1    Jan. 14, 2016

Related U.S. Application Data

(60) Provisional application No. 62/023,353, filed on Jul. 11, 2014, provisional application No. 62/169,036, filed on Jun. 1, 2015, provisional application No. 62/188,938, filed on Jul. 6, 2015.

(51) Int. Cl.
  *H04L 12/26* (2006.01)
  *H04L 12/24* (2006.01)

(52) U.S. Cl.
  CPC ............ *H04L 43/16* (2013.01); *H04L 43/065* (2013.01); *H04L 43/0847* (2013.01); *H04L 41/0213* (2013.01)

(58) Field of Classification Search
  CPC ......... H04L 47/10; H04L 47/35; H04L 47/30; H04L 47/32; H04L 47/11; H04L 47/12; H04L 43/50; H04L 43/00; H04L 1/00; H04J 3/14; H04W 24/00; H04B 10/0771
  USPC ........ 370/235, 229, 242, 252, 400, 401, 402
  See application file for complete search history.

(56) References Cited

U.S. PATENT DOCUMENTS

| | | | |
|---|---|---|---|
| 6,785,292 B1 * | 8/2004 | Vogel ................. | H04L 12/2801 348/E17.001 |
| 2007/0180142 A1 * | 8/2007 | Small ..................... | H04L 12/14 709/245 |
| 2013/0051442 A1 * | 2/2013 | Cooper ............. | H04L 25/03885 375/222 |
| 2013/0103822 A1 * | 4/2013 | Wolcott ................. | H04L 41/12 709/224 |
| 2014/0029655 A1 * | 1/2014 | Thompson ......... | H04B 10/0795 375/224 |

\* cited by examiner

*Primary Examiner* — Brenda H Pham
(74) *Attorney, Agent, or Firm* — Great Lakes Intellectual Property, PLLC

(57) ABSTRACT

Edge analytics and other processes for assessing performance of network elements operating at an edge or other remote access point of a service provider network is contemplated. The edge analytics may be facilitated with edge devices connected, embedded or otherwise associated with the network elements collecting data, metrics or other information reflective of the performance thereof.

18 Claims, 2 Drawing Sheets

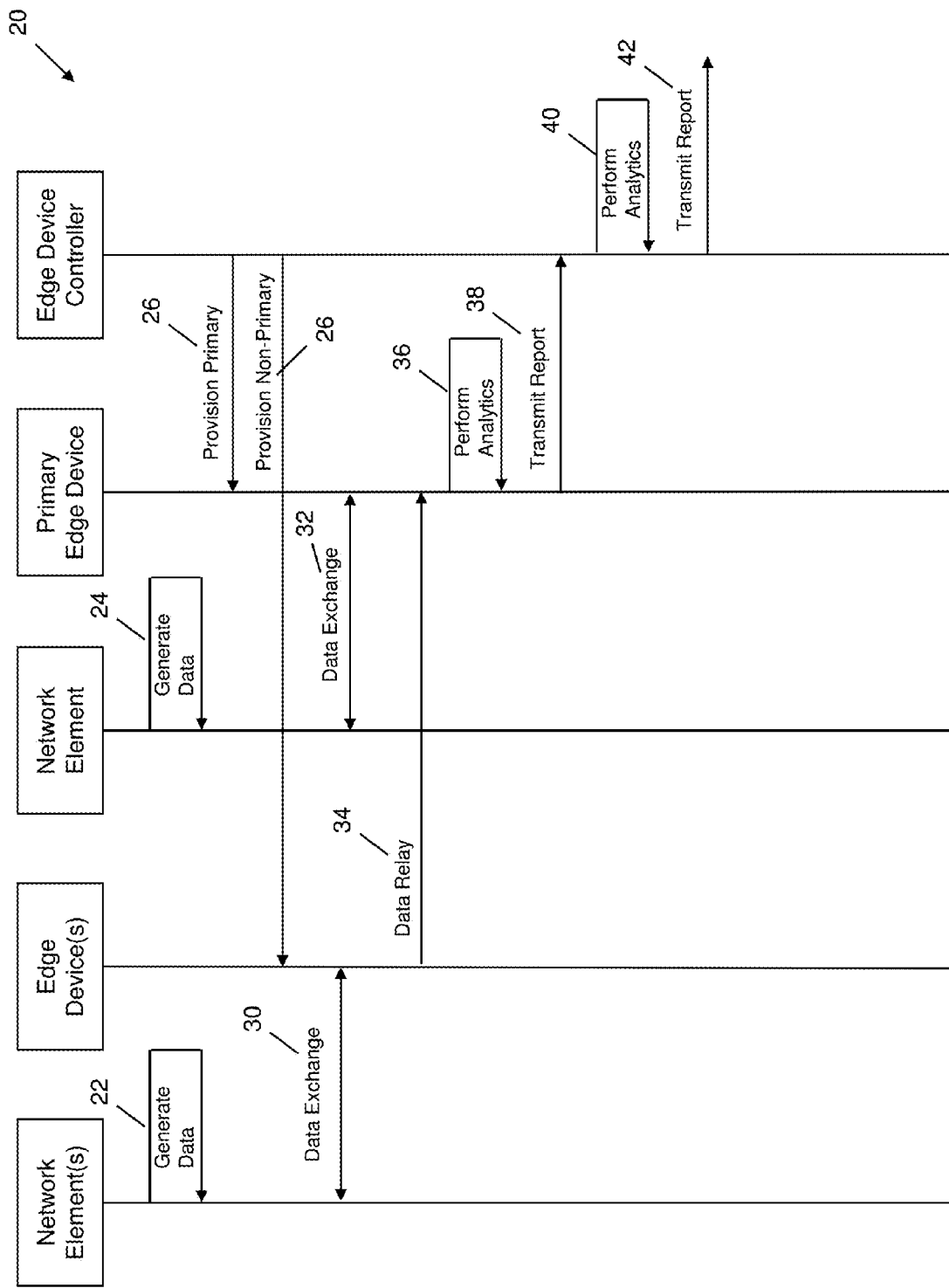

EDGE ANALYTICS

CROSS-REFERENCE TO RELATED APPLICATIONS

This application claims the benefit of U.S. provisional application No. 62/023,353 filed Jul. 11, 2014, U.S. provisional application No. 62/169,036, filed Jun. 1, 2015, U.S. provisional application No. 62/188,938, filed Jul. 6, 2015, the disclosures and benefits of which are hereby incorporated in their entireties by reference herein.

TECHNICAL FIELD

The present invention relates to facilitating edge analytics and other processes associated with assessing network health, performance, etc. at locations where service providers tend to interact with customers, such as but not necessarily limited to facilitating analytics for network elements included at such edge locations of the service provider network.

BACKGROUND

As cable networks evolve, and many diverse services such as telephony, data, video, business and advanced services (e.g., tele-medicine, remote education, home monitoring) are carried over them, the demand for maintaining a high level of reliability for services increases. To achieve such high reliability, the corresponding service operators at tasked with identifying and attempting to fix problems before negatively impacting service or inducing customer dissatisfaction. Cable delivery networks and edge devices (e.g. cable modem (CM), customer premise equipment (CPE)) traditionally have only minimally contributed to the measurement and analysis of network and service performance. Lack of measurement and analytics at the edge have prevented analysis and actuations that would increase plant reliability and customer satisfaction. One non-limiting aspect of the present invention contemplates embedding or co-locating devices with increasing computation and storage capacity into or with CMs, such as to move measurement and analysis close to the edge and/or provide near realtime visibility into the performance of the network.

BRIEF DESCRIPTION OF THE DRAWINGS

FIG. 2 illustrates a messaging diagram for a method of facilitating edge analytics in accordance with one non-limiting aspect of the present invention.

DETAILED DESCRIPTION

Figure 1:
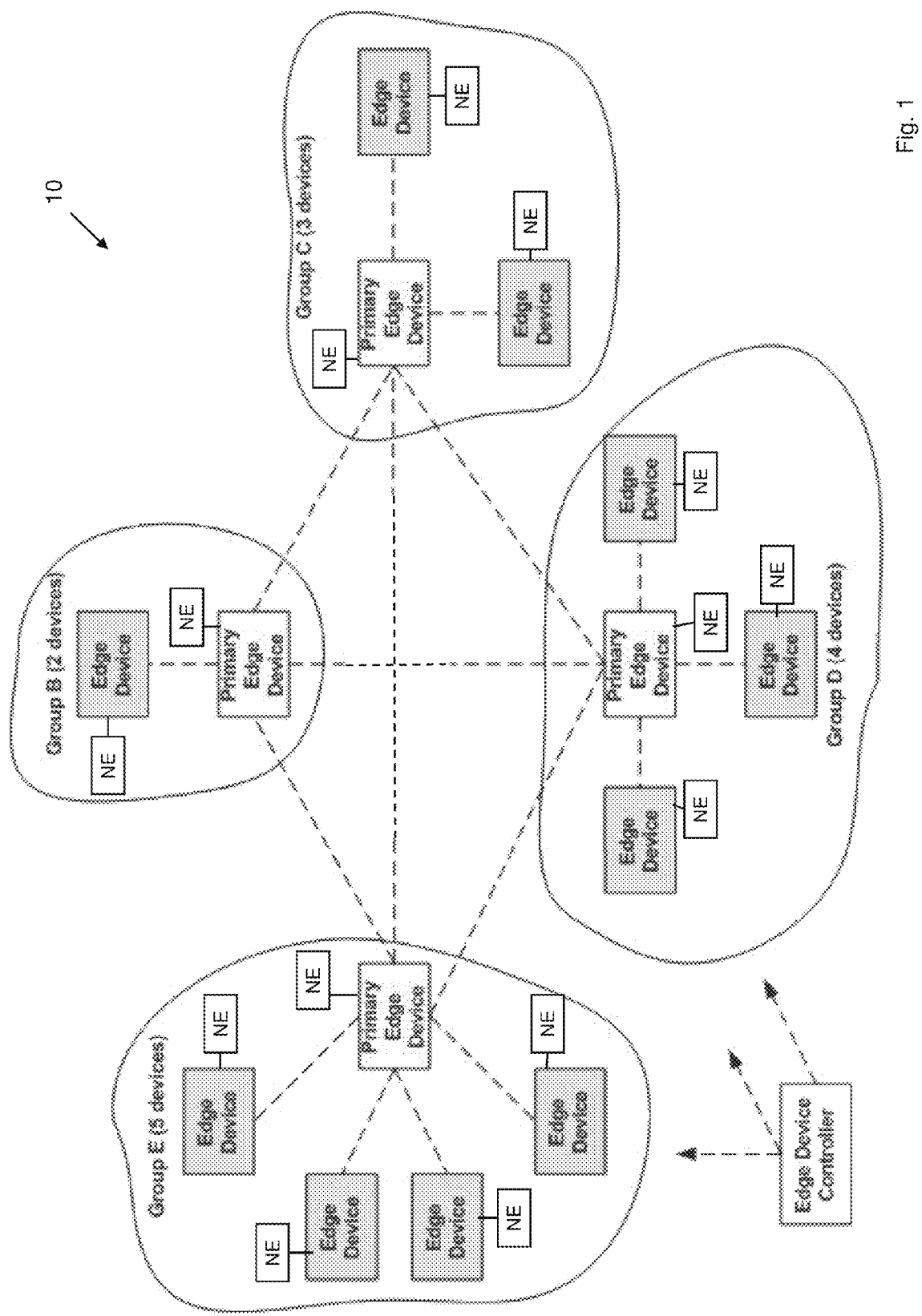
FIG. 1 illustrates a system for facilitating edge analytics in accordance with one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a system 10 for facilitating edge analytics in accordance with one non-limiting aspect of the present invention. The system 10 is predominately described with respect to of a plurality of network elements (NE) being cable modems (CMs) configured to interface customer premise equipment (CPE) or other devices with a service provider network (not shown) for exemplary purposes. The cable modems may optionally be configured in accordance with the Data-Over-Cable Service Interface Specifications (DOCSIS) version 3.0 and/or version 3.1 series of specifications. The related DOCSIS specifications may include the Physical Layer Specification (CM-SP-PHYv3.0 or v3.1), the Media Access Control and Upper Layer Protocols Interface Specification (CM-SP-MULPIv3.0 or v3.1), the Cable Modem Operations Support System Interface Specification (CM-SP-CM-OSSIv3.1), the Operations Support System Interface Specification (CM-SP-OSSIv3.0), the Converged Cable Access Platform Operations Support System Interface Specification (CM-SP-CCAP-OSSIv3.1), the Security Specification (CM-SP-SECv3.0 or v3.1) and/or the Cable Modem CPE Interface Specification (CM-SP-CMCIv3.0), the disclosures of which are hereby incorporated by reference in their entireties herein.

One non-limiting aspect of the present invention particularly contemplates facilitating edge analytics for cable modems as cable modems are representative of one type of network element commonly deployed but lacking capabilities sufficient to adequately perform the edge analytics contemplated herein. The present invention fully contemplates its use and application in facilitating edge analytics for other network elements, including those that may not be positioned at an edge location or those having capabilities sufficient to facilitate some or all of the contemplated analytics, as such network elements may similarly benefit from the operations and processes contemplated herein. One such benefit may correspond with the capability of the present invention to limit an amount of data being transmitted over the service provider network used to communicate with the network elements for the purposes of facilitating the contemplated analytics, which may be particularly beneficial for service providers having large-scale deployments with numerous network elements as the transmission of data therefrom for the purposes of facilitating edge analytics can consume vital network resources and/or degrade network performance. The usage of edge analytics is also described for exemplary non-limiting purposes as the present invention fully contemplates the analytics being performed on non-edge or other types of network elements.

A plurality of edge devices may be connected to or in communication with the plurality the network elements to facilitate collecting, measuring or otherwise obtaining data sufficient to facilitate the contemplated analytics. The system 10 illustrates an exemplary scenario where each edge device is tasked with monitoring one network element according to a one-to-one relationship. The network elements, particularly when cable modems, may be distributed on a subscriber-by-subscriber basis such that each customer premises includes a single network element or gateway to the corresponding service provider network. The allocation of one edge device to each such location may be required in order to sufficiently position the edge device within close proximity to the corresponding network element. The present invention is not necessarily so limited and fully contemplates a single edge device monitoring multiple network elements and/or multiple edge devices monitoring a single network element or sharing responsibilities for monitoring multiple network elements. The edge devices may be any logically operable or functional feature having capabilities sufficient to perform the operations contemplated herein, such as but not necessary limited to devices having a processor operable in response to a plurality of non-transitory instructions stored on a computer-readable medium associated therewith.

The edge devices may be configured to stand-alone from the corresponding network element and/or the edge devices may be integrated, embedded or otherwise included as part of the corresponding network element. Some of the edge devices may be embedded service/application functional entities (eSAFEs), single-board computers (e.g., Raspberry Pi), tablets, mobile phones, routers, etc. The present invention refers to such devices as edge devices in order to highlight one non-limiting aspect of the present invention to facilitate analytics for network elements deployed to edges of the service provider network where the network elements operate a last link or last connection point to the service provider network. The deployment of measurement devices to such edge locations can be beneficial as noise, power levels and other impairments can vary from location to location such that the local monitoring presence may be enable the present invention to perform the desired analytics. Each edge device may be assigned positional coordinates or other designations, address, etc. sufficient to differentiate its position from another, which may be beneficial when the network elements are attached to taps, branches, trunks or other spatially dependent positions within a geographical area or service area of the corresponding service provider.

An edge device controller may be included in the system to facilitate controlling, provisioning or otherwise directing operation of the edge devices. The edge device controller may include a non-transitory computer-readable medium having a plurality non-transitory instructions operable with a processor to facilitate the various operations contemplated herein. The edge devices may be configured to communicate with the edge device controller and/or with other edge devices using a suitable communication capability, such as through wireless and/or wireline signaling communicated directly therebetween and/or via a corresponding one of the network elements, i.e., communications between the edge devices and/or the edge device controller may occur over the service provider network associated with the network elements. One non-limiting aspect of the present invention contemplates the edge device controller grouping or otherwise arranging the edge devices into a plurality of groups to facilitate the contemplated analytics, such as by grouping network elements according to geographical location, trunks/line attachment, neighborhoods, operating capabilities or other demarcations. The groupings may be beneficial in limiting data communications and/or processing demands associated with performing the contemplated edge analytics through the use of group-based reporting and analytics.

One non-limiting aspect of the present invention contemplates a meshed architecture where the edge devices within one group communicate with each other and/or where the edge devices communicate with one edge device within the grouping designated by the edge device controller or selected though a contention process to be a primary edge device. Each group may include one such primary edge device operating similarly to the other edge devices within the group to monitor, measure or otherwise obtain data from/for a corresponding one of the network elements while also being further provisioned/enabled to act as a gateway or other interface for the corresponding grouping. The primary edge device may be configured to add and remove edge devices from the grouping and/or to designate secondary or backup edges devices to take its place in the event of failure of removal. One non-limiting aspect of the present invention contemplates the edge device controller provisioning the primary edge devices to perform analytics from the corresponding grouping according to data provided from the other, non-primary edge devices included therein. The primary edge devices in the various groupings may also be meshed or in communication with each other in order to facilitate sharing data and/or analytics with each other, such as to enable another primary edge device to assess its group analytics relative to another grouping.

In the event the network elements are cable modems configured in accordance with the above-noted DOCSIS specification, the edge devices may be configured to obtain data used for the contemplated analytics through messages exchanged therewith. Such network elements may include management information base (MIB) table, objects, etc. for representing data regarding its operation. This and other information may be included in data communicated through a cable modem to customer premise equipment (CPE) interface (CMCI) to the corresponding edge device using Simple Network Management Protocol (SNMP) requests and responses. The edge devices may be configured as SNMP agents operable to facilitate retrieve the MIBs or other data from the network elements. The edge devices may be configured to periodically poll or otherwise obtain such data from the network elements in response to certain triggering events (e.g., change of state, delta variances, etc.) and thereafter communicate the data to the other edge devices within the group or directly to the primary edge device. The edge devices may optionally be configured to communicate the data directly to the primary edge device instead of the other edge devices in order to conserve network resources, which may be beneficial in the event larger amounts of data are utilized to perform the analytics and/or data is obtained frequently. While the network elements may independently determine some or all of the data through monitoring or measuring the corresponding network element, reliance on the network elements to generate some or all the data may beneficial in facilitating uniformity of the collected data across network elements operable according to the same specifications and/or to leverage existing capabilities of the network elements without the need for proprietary application program interfaces (APIs) or software upgrades.

One non-limiting aspect of the present invention contemplates the network elements being configured in accordance with the DOCSIS Operations Support System Interface Specification CM-SP-OSSIv3.0-I26-150528, the DOCSIS Cable Modem Operations Support System Interface Specification CM-SP-CM-OSSIv3.1-I04-150611 and/or the DOCSIS Proactive Network Maintenance Using Preequalization specification CM-GL-PNMP-V01-100415, the disclosures of which are hereby incorporated by reference in their entireties herein. Optionally, the network elements may be configured in accordance with Internet Engineering Task Force (IETF) Request For Comments (RFC) entitled Radio Frequency (RF) Interface Management Information Base for Data over Cable Service Interface Specifications (DOCSIS) 2.0 Compliant RF Interfaces (RFC 4546), the disclosure of which is hereby incorporated by reference in its entirety herein. The network elements configured in accordance with the foregoing specifications may include capabilities sufficient to facilitate generating the MIBs associated with the data relied upon to perform the contemplated analytics as well as the capabilities sufficient to facilitate communicating the MIB/data to the corresponding edge device. The present invention is not necessarily limited to such network elements and fully contemplates the use of other specifications or operating characteristics amenable to reporting data sufficient to support the analytics operations contemplated herein.

Well not exclusive of the metrics capable of being provided from the network elements, the following metrics may be included in the data retrievable from the network elements:

Real and imaginary complex coefficients used to define some of the metrics may of an upstream pre-equalizer defined as:

F1R, F1I, F2R, F2I, F3R, F3I, F4R, F4I, ... F23R, F23I, F24R, F24I,

Adaptive Equalizer Main Tap Energy: The adaptive equalizer main tap may be in tap position eight although some implementations can have it in as low as the sixth position or the fourth position. The equalizer tap energy is given by the sum of the squares of the real and imaginary components of the coefficient. The main tap energy (MTE), assuming it in eighth position, is defined as:

$MTE = F8_R^2 + F8_I^2$

Main Tap Nominal Energy and Main Tap Nominal Amplitude: The pre-equalization taps exhibit different nominal or maximum amplitudes depending on CM implementations. The maximum of amplitude implementations from CMs is 2047, 1023 or 511. This parameter is defined here as the main tap nominal amplitude (MTNA). The square of the nominal amplitude yields the nominal tap energy. The main tap nominal energy (MTNE), assuming main tap is in the eighth position, is defined as:

$MTNE = F8nominal_R^2 F8nominal_I^2$

Pre-Main Tap Energy: The summation of the energy in all equalizer taps prior to the main tap may provide the pre-main tap energy (PreMTE). The pre-main tap energy assuming a main tap in the eighth position is defined as:

$PreMTE = F1_R^2 + F1_I^2 + F2_R^2 + F2_I^2 + F3_R^2 + F3_I^2 + \ldots + F7_R^2 + F7_I^2$ Post-Main Tap Energy: The summation of the energy in all equalizer taps after the main tap provides the post-main tap energy (PostMTE). The post-main tap energy assuming a main tap in the eighth position is defined as:

$PostMTE = F9_R^2 + F9_I^2 + F10_R^2 + F10_I^2 + \ldots + F23_R^2 + F23_I^2 + F24_R^2 + F24_I^2$ Total Tap Energy: The summation of the energy in all equalizer taps provides the total tap energy (TTE). The total tap energy is defined as:

TTE=PreMTE+MTE+PostMTE

Main Tap Compression: Adaptive equalizer main tap compression (MTC) at the CM is a good indicator of the available margin for the continued reliance on the equalization compensation process. An MTC ratio greater than 2 dB may suggest that equalization compensation can no longer be successfully achieved. This metric is given by the ratio of the energy in all taps to the main tap energy. Main tap compression at the CM translates to a less RF power level delivered to the CMTS. An MTC of 2 dB results in the CMTS receiving 2 dB less input power. Main tap compression at the CMTS is not expected under normal operating conditions. Any level of main tap compression at the CMTS should raise an alarm. The main tap compression expressed in dB is defined as:

$$MTC = 10\text{Log}\left(\frac{TTE}{MTE}\right)$$

Non-Main Tap to Total Energy Ratio (Distortion Metric): The adaptive equalizer's non-main tap to total energy ratio is a useful "distortion metric" to determine the distortion level in the upstream path. This parameter can be used as an initial assessment tool to determine which CMs need to be examined further and more frequently. This distortion metric is given as the ratio of the aggregate energy that exists in all but the main tap to the energy in all of the adaptive equalizer's taps. Notice that the main tap energy in the numerator is missing. The non-main tap energy ratio is also a good estimation of the MER assuming that the signal is not impacted by impairments that are not considered linear distortions, such as burst noise and nonlinear impairments. Non-main tap to total energy ratio at the CMTS is a good indicator of the type of upstream performance the CM signals have based on the amount of linear distortion present. If a 27 dB CNR is assumed for negligible errors with a 64-QAM signal, a NMTER target value of −27 dB can be assumed for comparable performance. If a 30 dB CNR is the threshold where correctable errors are beginning to appear, that would also correspond to a threshold of −30 dB NMTER when correctable errors begin to appear. This CNR to NMTER relationships are useful in determining thresholds from the NMTER values. An operator could assume an immediate action (red) NMTER threshold of −27 dB for 64-QAM operation and a monitor more frequently (yellow) NMTER threshold of −30 dB. The non-main tap to total energy ratio expressed in dB is defined as:

$$NMTER = 10\text{Log}\left(\frac{PreMTE + PostMTE}{TTE}\right)$$

Pre-Main Tap to Total Energy Ratio: The adaptive equalizer's pre-main tap to total energy ratio (PreMTTER) is a useful parameter along with the adaptive equalizer's pre-post tap symmetry to determine the group delay level in the upstream path. This distortion metric is the ratio of the pre-main tap energy to the energy in all taps. The pre-main tap to total energy ratio expressed in dB is defined as:

$$PreMTTER = 10\text{Log}\left(\frac{PreMTE}{TTE}\right)$$

Post-Main Tap to Total Energy Ratio: The adaptive equalizer's post-main tap to total energy ratio (PostMTTER) is a useful parameter to assess microreflection impairment contribution. This distortion metric is the ratio of the post-main tap energy to the energy in all taps. The post-main tap to total energy ratio expressed in dB is defined as:

$$PostMTTER = 10\text{Log}\left(\frac{PostMTE}{TTE}\right)$$

Pre-Post Energy Symmetry Ratio: The pre-post energy symmetry ratio (PPESR), along with pre-main tap to total energy ratio, is a useful parameter to indicate the presence of group delay in the upstream path. This distortion metric is the ratio of the post to pre-main tap energy ratios. The pre-post energy symmetry ratio expressed in dB is defined as:

$$PPESR = 10\text{Log}\left(\frac{PreMTE}{PostMTE}\right)$$

For practical purposes, the pre-post energy symmetry may be approximated using only the two taps adjacent to the main tap, giving the pre-post tap symmetry ratio (PPTSR):

$$PPTSR = 10\text{Log}\left(\frac{F7_R^2 + F7_I^2}{F9_R^2 + F9_I^2}\right)$$

FIG. 2 illustrates a messaging diagram 20 for a method of facilitating edge analytics in accordance with one non-limiting aspect of the present invention. The diagram 20 is predominately described with respect to operations associated with a particular grouping having a primary edge device and one or more non-primary, edge devices operable to assess operations of a corresponding network element for exemplary purposes as similar processes and interactions may occur at multiple groupings. The primary and non-primary edge devices are also shown for exemplary purposes with respect to generating data for a single network element connected thereto. Data generation processes 22, 24 may occur at the network elements where the network elements generate the data utilized to facilitate the analytics, such as in the manner described above with respect to populating certain MIBs with the various metrics. The data generation processes 22, 24 are shown to occur at the network elements for exemplary purpose as some or all of the data may be generated with the edge devices monitoring operations of the corresponding network element, sampling signaling, inspecting packets/message, etc.

A primary provisioning process 26 may occur where the edge device controller provisions the edge device selected to operate as the primary edge device within the grouping. The provisioning process 26 may correspond with the edge device controller providing mesh networking instructions or other communication instructions to facilitate establishing communications between the primary edge device and the other edge devices within the grouping and/or the primary edge device of the other groupings. The provisioning 26 may occur with the edge device controller providing a configuration file to the primary edge device having instruction sufficient to facilitate the operations contemplated therein. In the event the network element associated with the primary edge device is a DOCSIS cable modem, the edge device controller may utilize that network element to provision the primary edge device, e.g., by providing suitable type-length-values (TLVs) to the cable modem for subsequent delivery to the primary edge device, such as in a manner similar to that described in U.S. patent application Ser. Nos. 14/788, 610 and 14/788,653, the disclosures of which are hereby incorporated by reference in their entirety herein.

A non-primary provisioning process 26 may occur where the edge device controller provisions the remaining edge devices in the grouping to facilitate the operations contemplated herein. The provisioning 26 of the non-primary edge devices may occur in a similar manner to the provisioning of the primary edge device. The provisioning processes 24. 26 associated with the primary edge device and the non-primary edge devices may include multiple messages exchanged with the edge device controller, such as to enable the edge device controller to identify characteristics of the edge devices, location information, the network device associated therewith, etc. The primary provisioning process 24 is shown to be separate from the non-primary provisioning process 26 in order to demonstrate one non-limiting aspect of the present invention where the primary edge device is provisioned to perform analytics on behalf of the non-primary edge devices, i.e., without requiring the non-primary devices to perform some or all of the contemplated analytics. The ability to limit analytic related processing to the primary edge device may be beneficial in conserving system resources and/or the processing demands on the edge devices.

Data exchange processes 30, 32 may occur between the edge devices and the corresponding one of the network elements. The data exchange processes 30, 32 may include the edge devices issuing SNMP requests for MIB or other data stored on the network elements or otherwise available therefrom for use in performing the contemplated analytics. The edge devices may be configured to periodically poll the network elements for the data or await for occurrence of certain events, such as triggering events initiated at the network elements or instructions sent from the primary edge device and/or edge device controller. A data relay process 34 may occur with the non-primary edge devices relaying the data to the primary edge device, i.e., the edge devices may be configured to automatically relay the data upon receipt. A local analytics process 36 may be performed thereafter at the primary edge device to generate analytics for the network elements within the corresponding grouping. The local analytic process 36 may generate analytics on a per-edge devices basis, an average for the edge devices within the grouping and/or between one or more of the edged devices relative to analytics collected from the primary edge devices associated with other groupings.

One analytic may include the primary edge device determining whether the SNR, NMTER, PreMTTER or other metrics/data reported from the network elements are indicative of impairment, such as based on whether the corresponding metric exceeds an impairment threshold, average, etc. Another analytic may include the primary edge device assessing a radio frequency (RF) signal pattern representing an RF signal associated with one of the network elements and determining whether the RF signal pattern is indicative of impairment or non-impairment. The primary edge device may include a signature catalog of various RF signal patterns, optionally including those previously generated by the corresponding network element, whereby impairments may be determine if the RF signal pattern matches with an impaired signature or fails to match with a non-impaired signature. The analytics 36 may optionally be performed in a snapshot manner whereby the analytics cover a particular interval in time and/or a trend manner whereby changes or deltas over multiple intervals form the values being analyzed.

A local report process 38 may occur where a report is transmitted to the edge device controller to report the local analytics. The report process 42 may include analytics indicative or impairment and non-impairment or it may limit the amount of data being communicated to the edge device controller to that associated with impairments, e.g., the report may list the network elements determined as impaired and omit those determined as non-impaired. The report process 42 may also limit the amount of data being communicated by averaging the metrics or other data formulating the analytics such that the analytics represent an average for the entire group as opposed to the individual network elements. The report process 42 may be beneficial in providing a distributed process for determining analytics without requiring an entirety of the data and/or resulting analytics to be provided to the edge device controller. This capability may allow the edge device controller to monitor more groups and/or ameliorate the processing that would otherwise occur at the edge device controller or a core controller upstream thereof if the data were reported directly thereto for analytics.

A controller analytics process 40 may occur based on the analytics and/or other data provided from the primary edge device, such as to generate analytics similar to that of the local analytic process 36 whereby group averages from the other groups may take the place of the individual network elements associated with the local analytic process 36. The controller analytics process 40 may optionally include the edge device controller requesting the primary edge device to perform additional analytics, such as to identify a particular source of impairment or to perform additional neighbor analysis to determine whether additional groups are experiencing similar impairments or contributing impairment to another group. A controller report process 42 may thereafter occur where a report is transmitted upstream to the core controller or other administrative level controller associated with the service provider network. The controller report process 42 may be similar to the local report process 38 whereby limited information is communicated upstream in order to maintain the distributed process model.

As supported above, one non-limiting aspect of the present invention contemplates distributed computing in which components share data thru messages. The components collaborate with each other to accomplish a common goal. In this case, the goal may be to identify impaired signals occurring across various nodes on the network and then communicate this information back to decision systems to provide automated or manual fixes. Another aspect of the present invention contemplate mesh network in which each node/edge device cooperates to share in the distribution of data in the network. In this, case edge devices in a neighborhood distribute and share data, which would be organized into a neighbor mesh, could communicate using the Wi-Fi router located in Cable Modems. Another aspect of the present invention contemplates signature catalog and analysis for identifying upstream and downstream signal signatures in a DOCSIS network where RF signal signatures indicate whether the pattern matches a nominal or an impaired signal. This may provide a model for, in real-time, identification of RF signal patterns that may optionally focus solely on methods for capturing signatures inherent in RF signals. For example, various impairments require different methods for identification. The identification methods could include using signature-based detection, heuristics, and other models. Methods for cataloging nominal and impaired upstream and downstream RF signals on a DOCSIS network is also contemplated whereby an impairment catalog may enable dynamically adding and removing impairment signatures on a periodic basis to continue tuning impairment analysis for individual and meshed signal impairment analysis.

One non-limiting aspect of the present invention contemplates a proactive network maintenance (PNM) methodology based on pre-equalization coefficients. The first general component is the data collection process. It comprises polling all CMs to obtain preequalization data from all configured upstream channels. The gathered data is verified for format integrity and is normalized to be useful for comparison. For scalability purposes, the data collection process is conducted using a more frequent polling cycle for the CMs that exhibited apparent distortion above a predetermined level and a less frequent cycle for all CMs. The second general process incorporates the initial distortion assessment that is conducted on all CMs that are monitored more frequently. This process uses the non-main tap to total energy (NMTER) ratio to discriminate which CMs should be examined in more detail and which should be left for evaluation in the next coarse monitoring cycle. The third component in this approach conducts the detail analysis that includes the calibration process and the determination of the distortion signatures from frequency domain and time domain analysis. These signatures include group delay and micro-reflections. In case of multiple different micro-reflections, the signatures are obtained after a discrimination process. The fourth component takes the distortion signatures and evaluates whether from a static perspective they should be classified as red which implies the need for immediate action, or as yellow which indicates the CM should be monitored more frequently and its distortion data be stored for observation over time. The information describing which CMs have to be examined more frequently is communicated to the data collection process. Green classification indicates that no action is necessary. The fifth process takes the CM signatures and identifies within a fiber node's service area which micro-reflections are common to several CMs. The next process identifies by comparing historical data collected in the yellow classified CMs whether intermittent issues or trending issues are of concern and may require action. The last process is the one that correlates the affected CM or CMs with the outside plant topology and uses that information to determine fault location.

One non-limiting aspect of the present invention contemplates deploying high capacity storage and processing devices as co-located or embedded devices with Cable Modems and other suitable devices, gateways, interfaces, etc. These edge devices may then be used to collect real time RF upstream and downstream signal data and/or full-band data, perform local analysis on the edge device and across neighbor edge devices and report the results of the analysis upstream to the CMTS and PNM servers. This will enable full analysis of the signals at each modem and enable neighbor analysis for root cause identification and reporting. This will enable the vision of full Proactive Network Analysis (PNM). This concept may include development of a new set of ideas including: Distributed mesh computing; Security models for edge devices; plant peering communications; device registrations; communications across edge devices; configuration management; messaging formats; edge analysis; mesh analysis; edge device to/from cable modem communications and others. There is significant commercial value to the hardware and software developers and to the service providers (e.g. MSOs) as this will enable the ability to deploy and leverage full spectral analysis at the edge in the cable modems. One options is to facilitate a periodic sweep of the cable modems, collecting data samples on an infrequent basis. These can then be analyzed to look for impairments. The other concepts described herein may be more beneficial and may allow the cable modems (and embedded or co-located devices) to analyze their RF signals on a real-time basis individually and across neighbors and report impairments and signal degradation as soon as it occurs. Deploying this technology may increase plant service and may enable many new quality based services (e.g. Business SLAs) with the service providers. The present invention may be beneficial telecommunication system (Plain old telephone service (POTS), cellular telephone/data systems, digital broadcast satellite (DBS), cable television system, multiple system operators (MSOs), Multiple-Input-Multiple Output Systems MIMO (such as that described in U.S. patent application Ser. Nos. 13/769,288, 14/181,640, 14/181,641, 14/181,643 and 14/181,645, the disclosures of which are hereby incorporated by reference in their entireties).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for facilitating edge analytics comprising:
a plurality of edge devices configured to facilitate analytics for a plurality of network devices positioned at edges of a service provider network;
an edge device controller configured to provision the plurality of edge devices to facilitate the analytics, the provisioning including:
i) grouping the plurality of edge devices such that at least a first portion of the plurality of edge devices are associated with a first group and at least a second portion of the plurality of edge devices are associated with a second group;
ii) designating one of the edge devices within the first group as a primary edge device and one of the edge devices within the second group as a secondary edge device; and
iii) instructing the primary edge device to perform analytics as a function of data transmitted thereto from the edge devices in the first group and the secondary edge device to perform analytics as a function of data transmitted thereto from the edge devices in the second group, including thereafter reporting the analytics to the edge device controller on behalf of the edge devices in the corresponding first and second groups;
wherein the plurality of edge devices are provisioned to collect at least the following data from a corresponding one of the network elements:
i) a pre-main tap energy (PreMTE) sufficient to represent a summation of energy in all equalizer taps prior to a main tap;
ii) a post-main tap energy (PostMTE) sufficient to represent a summation of energy in all equalizer taps after the main tap; and
iii) a total tap energy (TTE) sufficient to represent a summation of energy in all equalizer taps;
wherein the first and second primary edge devices are provisioned to determine a pre-main tap to total energy ratio (PreMTTER) for the network elements as a function of the data provided from the edge devices, the PreMTTER being represented as:

$$PreMTTER = 10 Log\left(\frac{PreMTE}{TTE}\right);$$

and
wherein the primary and secondary edge devices are configured to transmit a PreMTTER report to the edge device controller listing each network element within the corresponding first and second group with the PreMTTER exceeding a threshold representing impairment, the PreMTTER report omitting the network elements with the PreMTTER failing to exceed the threshold.

2. The system of claim 1 wherein the plurality of edge devices are provisioned to collect the data from management information base (MIB) responses sent from the plurality of network devices.

3. The system of claim 2 wherein the plurality of network devices are cable modems configured to transmit the MIB responses with equalization information for a receiver associated therewith.

4. The system of claim 3 wherein the cable modems are configured to transmit the MIB responses through a cable modem to customer premise equipment (CPE) interface (CMCI) in response to receipt of a Simple Network Management Protocol (SNMP) request from the corresponding one of the edge devices.

5. The system of claim 4 wherein the plurality of edge devices are configured as SNMP agents operable to issue the SNMP requests to the corresponding one of the cable modems.

6. The system of claim 1 wherein the primary and secondary edge devices are provisioned to determine a non-main tap to total energy ratio (NMTER) for the network elements as a function of the data provided from the edge devices, the NMTER being represented as:

$$NMTER = 10 Log\left(\frac{PreMTE + PostMTE}{TTE}\right).$$

7. The system of claim 6 wherein the primary and secondary edge devices are configured to transmit a NMTER report to the edge device controller listing each network element within the corresponding first and second group with the NMTER exceeding a threshold representing impairment, the NMTER report omitting the network elements with the NMTER failing to exceed the threshold.

8. The system of claim 1 wherein the plurality of edge devices are provisioned to include a radio frequency (RF) signal pattern as at least part of the data transmitted to the corresponding one of the primary and secondary edge devices, the RF signal pattern sufficient for patterning an RF signal associated with the corresponding one of the network elements.

9. The system of claim 1 wherein the plurality of edge devices are provisioned to include a radio frequency (RF) signal pattern as at least part of the data transmitted to the corresponding one of the primary and secondary edge devices, the RF signal pattern sufficient for patterning an RF signal associated with the corresponding one of the network elements.

10. The system of claim 8 wherein the primary and secondary edge devices are configured to transmit a pattern report to the edge device controller listing each network element within the corresponding first and second group having the RF signal pattern indicative of impairment, the pattern report omitting the network elements having the RF signal pattern indicative of non-impairment.

11. The system of claim 9 wherein the primary and secondary edge devices compare the RF signal patterns to signature patterns included in a signature catalog to determine whether the RF signal patterns are indicative of impairment or non-impairment.

12. The system of claim 1 wherein the primary and secondary edge devices are configured to generate the analytics according to at least one of a snapshot of the data and a trend of the data, the snapshot analytics being based on network element operations at a single time interval and the trend analytics being based on network element operation variations over multiple time intervals.

13. The system of claim 1 wherein:
the plurality of network elements are cable modems configured to determine a signal-to-noise (SNR) for at least one interface included thereon;
the plurality of edge devices are provisioned to obtain the SNR from a corresponding one of the network elements and then report the SNR to the first or second primary edge device in the corresponding grouping; and
the first primary edge device determines a first SNR metric for the first group as a function of the SNRs reported thereto, the first primary edge device thereafter determining whether the first SNR metric exceeds a threshold indicative of impairment, and when the SNR exceeds the threshold the first primary edge device:
i) obtains a second SNR metric from the second primary edge device, the second SNR metric being determined by the second primary edge device as function of the SNRs reported thereto; and
ii) transmits a SNR report having the first and second SNR metrics to the edge device controller.

14. The system of claim 13 wherein the edge device controller provisions the primary and secondary edge devices to generate reports, the reports indicating each cable modem in the corresponding first and second group having analytics indicative of impairments and omitting each cable modem having analytics indicative of non-impairment.

15. The system of claim 13 wherein the edge device controller provisions the edge devices to obtain the data from management information base (MIBs) of the cable modems.

16. The method of claim 15 further comprising provisioning the primary edge devices to transmit an impairment report to the edge device controller located upstream thereof, the impairment report identifying each cable modem having data indicative of impairment and omitting each cable modem having data indicative of non-impairment.

17. A system for facilitating analytics of a plurality of cable modems comprising:
a plurality of edge devices configured to obtain data one or more of the cable modems;
an edge device controller configured to provision the plurality of edge devices, the provisioning including:
i) grouping the plurality of edge devices such that at least a first portion of the plurality of edge devices are associated with a first group and at least a second portion of the plurality of edge devices are associated with a second group; and
ii) designating a primary edge device of the edge devices within the first group to perform analytics for the data collected with the edge devices therein and secondary edge device of the edge devices within the second group to perform analytics for the data collected with the edge devices therein
wherein the plurality of edge devices are provisioned to collect at least the following data from a corresponding one of the cable modems:
i) a pre-main tap energy (PreMTE) sufficient to represent a summation of energy in all equalizer taps prior to a main tap;
ii) a post-main tap energy (PostMTE) sufficient to represent a summation of energy in all equalizer taps after the main tap; and
iii) a total tap energy (TTE) sufficient to represent a summation of energy in all equalizer taps;
wherein the first and second primary edge devices are provisioned to determine a pre-main tap to total energy ratio (PreMTTER) for the cable modems as a function of the data provided from the edge devices, the PreMTTER being represented as:

$$PreMTTER = 10 \text{Log}\left(\frac{PreMTE}{TTE}\right);$$

and
wherein the primary and secondary edge devices are configured to transmit a PreMTTER report to the edge device controller listing each cable modem within the corresponding first and second group with the PreMTTER exceeding a threshold representing impairment, the PreMTTER report omitting the cable modems with the PreMTTER failing to exceed the threshold.

18. A method for performing edge analytics on a plurality of cable modems configured to store data in one more of more management information bases (MIBs) comprising:
provisioning a plurality of edge devices connected to a corresponding one of the cable modems to request the data using Simple Network Management Protocol (SNMP);
grouping the plurality of edge devices into a plurality of groupings; and
designating primary edge device of the edge devices within each of the plurality of groups to generate analytics for the cable modems grouped therein as a function of the data collected with the edge devices grouped therein;
provisioning the plurality of edge devices to collect at least the following data from a corresponding one of the cable modems:
i) a pre-main tap energy (PreMTE) sufficient to represent a summation of energy in all equalizer taps prior to a main tap;
ii) a post-main tap energy (PostMTE) sufficient to represent a summation of energy in all equalizer taps after the main tap; and
iii) a total tap energy (TTE) sufficient to represent a summation of energy in all equalizer taps;
provisioning the primary edge devices to determine a pre-main tap to total energy ratio (PreMTTER) for the cable modems as a function of the data provided from the edge devices, the PreMTTER being represented as:

$$PreMTTER = 10\text{Log}\left(\frac{PreMTE}{TTE}\right);$$

and
configuring the primary edge devices to transmit a PreMTTER report to an edge device controller listing each cable modem within the corresponding first and second group with the PreMTTER exceeding a threshold representing impairment, the PreMTTER report omitting the cable modems with the PreMTTER failing to exceed the threshold.

\* \* \* \* \*